No. 648,411. Patented May 1, 1900.
M. M. JAENNIGEN.
APPARATUS FOR SPRAYING OR DIFFUSING FLUIDS AND MOISTENING AIR IN WORKSHOPS OR OTHER PLACES AND FOR LIKE PURPOSES.
(Application filed Nov. 22, 1897.)
(No Model.) 2 Sheets—Sheet 1.
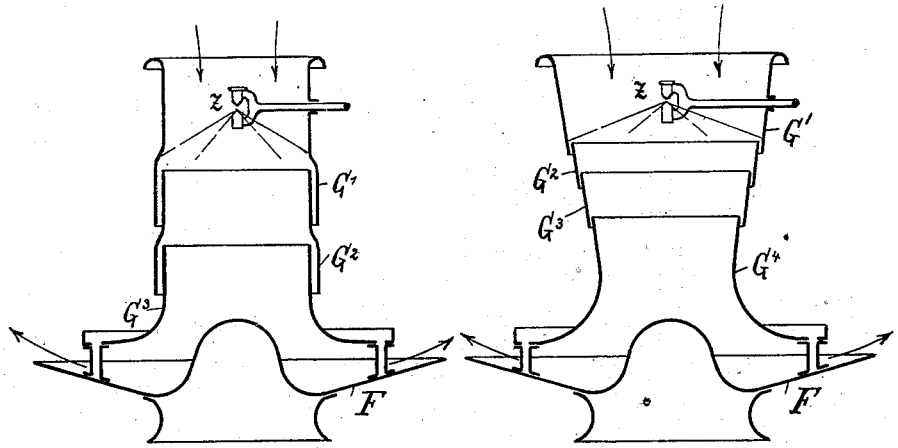

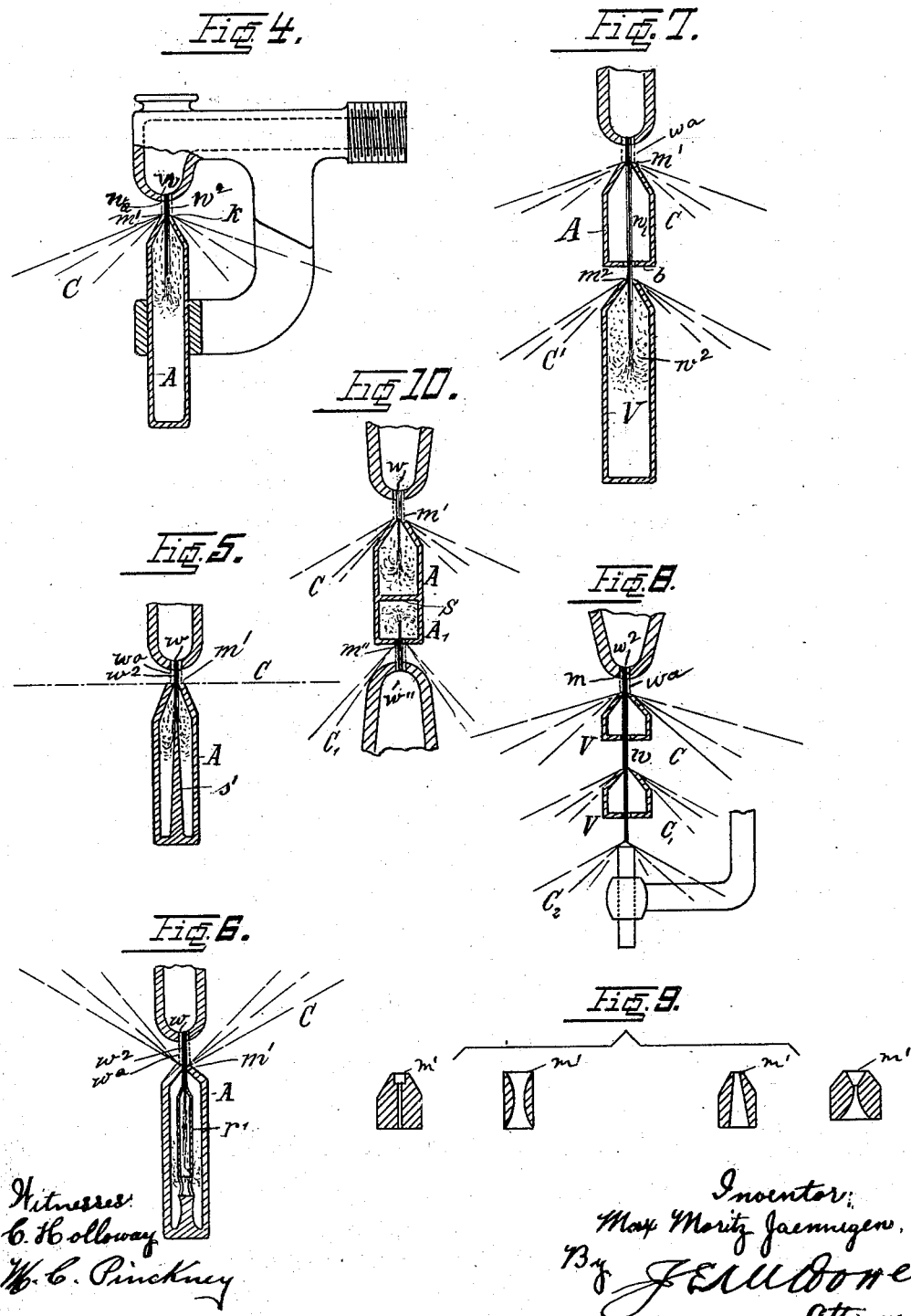

UNITED STATES PATENT OFFICE.

MAX MORITZ JAENNIGEN, OF VIENNA, AUSTRIA-HUNGARY.

APPARATUS FOR SPRAYING OR DIFFUSING FLUIDS AND MOISTENING AIR IN WORKSHOPS OR OTHER PLACES AND FOR LIKE PURPOSES.

SPECIFICATION forming part of Letters Patent No. 648,411, dated May 1, 1900.

Application filed November 22, 1897. Serial No. 659,536. (No model.)

*To all whom it may concern:*

Be it known that I, MAX MORITZ JAENNIGEN, a citizen of Germany, and a resident of Vienna, in the Empire of Austria-Hungary, have invented certain new and useful Improvements in Apparatus for Spraying or Diffusing Fluids and Moistening Air in Workshops or other Places and for Like Purposes, of which the following is a specification.

This invention relates to an apparatus for spraying or diffusing fluids and moistening air in workshops and other places and for like purposes; and it consists in the construction and arrangement of the suction-casing combined with the atomizer and diffuser arranged inside the said casing. The casing is so arranged that the water which is not atomized as well as the larger particles of water are discharged from the interior wall of the casing to outside the said casing closely beneath that part of the interior of the casing with which the water discharged by the atomizer is brought into contact, so that any large particles of water are prevented from passing down the interior of the casing in such a manner as to absorb considerable quantities of the properly-atomized water, and these large particles of water, as well as that which is not atomized, are caused to pass to the outside and immediately beneath that part of the interior of the casing whereonto the water is forced, so as to immediately be taken out of contact with the air-current and properly-atomized water traversing the interior of the casing. The said casing therefore differs materially from casings hitherto used, in which the water not atomized or properly atomized is only discharged just above the catch-tank, whereby not only is a considerable portion of the properly-atomized water reabsorbed and carried away with the said unatomized water or improperly-atomized water, but water which is not properly atomized is conveyed into the atmosphere to be moistened.

In order that the water which is not atomized and the larger particles of water shall be deflected and discharged immediately beneath the place where the liquid from the atomizer is forced into contact with the inside of the casing, the said casing is interrupted or has slots or openings all around immediately beneath the part with which the water from the atomizer comes in contact, which can be done by making the casing in two or more parts, a free annular space being left between them and they being arranged underneath one another or the one partly inserted into the other, so that the upper part overlaps the inner part.

In the accompanying drawings I have illustrated in Figures 1, 2, and 3 in vertical section, as examples, three constructions of casings according to my invention. Figs. 4, 5, 6, 7, 8, and 10 are central vertical sections of different forms of my atomizing or diffusing device, and Fig. 9 is a similar view of several different forms of tips.

The casing consists of the upper portion G', inclosing the atomizer and diffuser Z. In the arrangement Fig. 1 this portion G' is widened out just below the place where the liquid strikes the interior of the casing, this widened portion extending down outside the upper part of the second portion $G^2$ of the casing, the upper edge or rim of which second portion extends to near the inner outwardly-extending side of the portion G', so as to leave a free space between both portions of the casing for the deflection and discharge of the water not atomized or not properly atomized. The portion $G^2$ may either have its lower edge also widened out similarly to the part G' and receive an analogous portion $G^3$, and this latter another portion, if desired, and so on, or the said portion $G^2$ may, as represented in Fig. 3, extend down to the catch-tank F.

In the arrangement shown in Fig. 2 the portions G' $G^2$ $G^3$ $G^4$, constituting the casing, are in the form of truncated cones and are so inserted into one another that the respective edges overlap each other, as shown, annular free spaces being left between each adjacent two of them.

The constituent portions of the casing may be simply cylindrical or of any other suitable shape. The edge or rim of the portion lying nearest to the catch-tank F is turned upward, so as to form a catch groove or channel for the deposited water, from which channel the water overflows or passes by any suitable channel into the catch-tank or into the return-conduit.

The space inside the casing is of the same cross-sectional area throughout in the arrangement Fig. 1 and gradually decreases in the arrangement Fig. 2. In the former case the speed of the induced air-current remains uniform, while in the latter case the said current increases in proportion as the space lessens. If, however, the closely-adjacent edges of the portions $G'$ and $G^2$ be first turned outward and then inward, as shown in Fig. 3, the induced air-currents will first expand in the wider part and subsequently be compressed in the narrower part, whereby a very efficient flow and supply of air is attained.

In all cases the water not atomized as well as the large particles of water are discharged to the outside of the casing immediately beneath the part of the interior of the casing whereonto the water from the atomizer is forced, and the said water is consequently rapidly removed from contact with the air-currents and the properly-atomized water, so that the properly-atomized water is prevented from being absorbed and carried away by the said unatomized or improperly-atomized water.

Figs. 4 to 10 represent atomizing and diffusing devices suitable for use in the said casing, the said devices including a hollow and preferably bottle-shaped body A with a bore through it, against which body a water-jet $w$ impinges in a straight line at a pressure which is in accordance with the purposes for which the device is intended. The central core $w^2$ of the liquid-jet $w$ (the said core being shown by a solid black line) penetrates the bottle-shaped body A, which is filled with water up to its mouth $m'$, and the water which enters body A loses its *vis viva* and displaces an equal quantity of water from the vessel A, which steadily and evenly leaves the bottle-mouth $m'$ over the edge $k$ without forming a vortex and without any concussion joins the liquid veil or spray C and is atomized. The liquid veil or spray C is formed at the edge $k$ of the bottle-mouth by the outer jet $w^a$ impinging against the edge of the mouth $m'$. According as either a plate-shaped liquid spray or veil C or liquid cone C, respectively, or an upwardly or downwardly directed spray or cone is required the edge of the mouth $m'$ is either flattened out broadly, as shown in Fig. 5, or is formed conically inward, as shown in Fig. 6, or is formed conically outward or slightly flattened, as shown in Fig. 4. In all cases, however, the liquid veil or spray C is formed directly on the mouth edge of the hollow body A, while the central stream of water is completely separated from the exterior layer or mantle of the jet of water forming the veil or cone C, on which the atomizing and diffusing effect takes place, so that consequently the said core is not, as in the case of simple solid or slightly cut-out recoil bodies or counter-current nozzles, (against which the jet is caused to impinge,) forced back upwardly. This atomizing effect takes place equally around the circular line of the mouth edge and is therefore extremely uniform and complete. To further facilitate a steady and uniform outflow of the displaced water from the body A, there can be arranged axially in the interior of the hollow body A a pin $s'$, terminating in a point, Fig. 5, or small tube $r'$, open at its bottom, Fig. 6, upon which point, Fig. 5, the water is forced, and thereby rapidly spread out or divided, or into which tube the water enters and disperses itself therein, Fig. 6, while in both cases any too-strong concussion of the water accumulated in the interior of the hollow body is prevented.

The hollow bottle-shaped body A by an arrangement such as is shown in Fig. 7 offers a simple means for multiplying the liquid-veil C to any extent by providing the bottom $b$ of the bottle with a bore $m^2$, coaxial with the mouth $m'$ and of a diameter in accordance with the thickness of the liquid spray to be produced. The liquid-core $w^2$ within the bottle-shaped part V, for instance, has solely to overcome the resistance offered by the liquid itself if the bore $m^2$ be equal to or larger than $m'$, Fig. 7; and in this case the second liquid-spray $C'$ becomes stronger than would be the case if $m^2$ were smaller than $m'$. According to the purpose assigned to the nozzle the above-described multiplication of the liquid-sprays may be effected any number of times, while on the other hand the nozzle may receive any other appropriate construction. Speaking generally, by inserting $n$ multipliers V $n+l$ sprays or veils of liquid will result. The total amount of water of all the $n+l$ sprays of liquid is equal to the amount of liquid supplied from the primary nozzle $m$, Fig. 8. The effect of the multipliers V V, which merely serve to split off a second, third, and so on spray of water and may, therefore, simply take the form of a body with cylindrical or conical bore, Fig. 9, is that the water is more perfectly atomized, for each of the several separate water-sprays has its own atomizing effect.

Fig. 10 represents the combination of two single-jet nozzles acting with their respective mouths $w'$ and $w''$ against one duplex bottle-shaped body A A', common to each. I do not consider the diaphragm S essential in such double-nozzle apparatus.

Although for the purpose of description I have referred to water, it will be understood that any other fluid to the spraying or diffusing of which the apparatus is applicable can be used in place of water.

Having now particularly described and ascertained the nature of the said invention and in what manner the same is to be performed, I declare that what I claim is—

1. The combination in an apparatus such as described of a casing through which a current of air to be moistened may be passed, said casing having one or more circumferential outlets from the interior of the casing, an atomizing device within the casing and adapted to spray liquid against the inside of the casing at a height immediately above one or more of said circumferential outlets, whereby any unatomized portions of said liquid will be at once separated from contact with air passing through the casing.

2. The combination in an apparatus such as described of a casing through which a current of air to be moistened may be passed said casing having a plurality of circumferential outlets from the interior of the casing, and atomizing devices within the casing and adapted to spray a liquid against the inside of the casing at a height immediately above said outlets, whereby any unatomized liquid will immediately separate from contact with air passing through said casing.

Signed at Vienna, in the Empire of Austria-Hungary, this 30th day of October, 1897.

MAX MORITZ JAENNIGEN.

Witnesses:
HENRY C. CARPENTER,
CHAS. E. CARPENTER.